United States Patent [19]

Kruesi

[11] 4,209,501

[45] Jun. 24, 1980

[54] CHLORIDES OF LEAD, ZINZ, COPPER, SILVER AND GOLD

[75] Inventor: Paul R. Kruesi, Golden, Colo.

[73] Assignee: Cato Research Corporation, Wheatridge, Colo.

[21] Appl. No.: 872

[22] Filed: Jan. 4, 1979

Related U.S. Application Data

[60] Continuation-in-part of Ser. No. 906,026, May 15, 1978, abandoned, which is a division of Ser. No. 813,884, Jul. 8, 1977.

[51] Int. Cl.$^2$ .................. C01G 21/16; C01G 9/04; C01G 3/04; C01G 5/00; C01G 7/00
[52] U.S. Cl. ........................... 423/491; 423/493; 423/494; 423/DIG. 12; 423/46; 423/89; 423/99; 75/111; 75/112
[58] Field of Search ....... 423/491, 493, 494, DIG. 12, 423/46, 89, 99; 75/111-113

[56] References Cited

U.S. PATENT DOCUMENTS

| | | | |
|---|---|---|---|
| 1,388,086 | 8/1921 | Ashcroft | 423/DIG. 12 |
| 3,679,359 | 7/1972 | Haberland et al. | 423/493 |
| 3,894,927 | 7/1975 | Kane et al. | 423/DIG. 12 |
| 3,988,417 | 10/1976 | Polinsky | 423/491 |

OTHER PUBLICATIONS

Beck et al., "APC Printed Publication", S.N. 292742, Jul. 13, 1943.
Beck et al., "APC Printed Publication", S.N. 393258, Jul. 13, 1943.
Delarue, "Chimie Analytique", vol. 44, Mar. 1962, pp. 91-101 (Translation pp. 1-29.

*Primary Examiner*—Herbert T. Carter
*Attorney, Agent, or Firm*—Sheridan, Ross, Fields & McIntosh

[57] ABSTRACT

A process for forming a metal chloride of a metal or its compound comprising forming a liquid fused salt bath mixture of at least two metal chlorides with one of the chlorides being selected from the group consisting of ferric chloride, ferrous chloride, cupric chloride and cuprous chloride, and introducing the metal or compound into the liquid fused salt bath in the presence of a chlorine source to form the metal chloride and elemental sulfur, and recovering the formed chloride from the liquid fused salt bath mixture. Chlorine gas or sulfur chloride may be introduced into the bath as an additional source of chlorine for reaction with the metal and for the generation of a portion of the ferrous chloride or cuprous chloride into ferric chloride or cupric chloride.

23 Claims, No Drawings

CHLORIDES OF LEAD, ZINZ, COPPER, SILVER AND GOLD

CROSS REFERENCES TO RELATED APPLICATIONS

This application is a continuation-in-part application of Ser. No. 906,026 filed May 15, 1978 and now abandoned which is a divisional application of Ser. No. 813,884 filed July 8, 1977.

TECHNICAL FIELD

The invention lies in the field of forming metal chlorides from metals or metal compounds, such as oxides, sulfides, carbonates and sulfates. The chlorination may be for various purposes, such as the recovery of metals from their ores or for the manufacture of the chloride for subsequent use.

BACKGROUND ART

Chlorination has long been considered as a means for recovering metal values from ores, scrap and other material. An example is the commercial process for recovering titanium. This process is practical because the chloride, titanium tetrachloride, is a liquid at room temperature and a gas at a 136° C. This is in contrast to most other metal chlorides which melt at high temperatures which makes them difficult to chlorinate by direct chlorination under ambient conditions. Because of the high melting point of these chlorides they form an impervious surface on the particles being chlorinated which prevents the chlorination reaction from going to completion. Another difficulty is that the chlorides formed sometimes form viscous liquids which inhibit movement in the fluid beds frequently used in chlorination and which again result in incomplete reaction.

Another major difficulty in producing the high melting point chlorides is that, except in a case where the metal chloride can be removed because it is volatile, the separation of one metal chloride from another is a difficult and expensive procedure. Thus, it has been necessary to dissolve the chlorides formed in water to perform separations and purification and this involves substantial expense. Although chlorination of most metals has been demonstrated in the laboratory, it has not been practical commercially for the reasons set forth above.

Iron is an example of a metal which cannot be economically recovered from its ore by present chlorination procedures. This metal is frequently encountered in nature either as an impurity in valuable materials or as a material of value which contains impurities which must be removed in order for the iron to be useful. In processing iron ores or iron-containing materials, chlorination has been suggested as a process route. Thus, in U.S. Pat. No. 2,895,796 a process is disclosed directed to recovering iron from pyrite in which the latter is chlorinated to ferrous chloride and sulfur under ambient conditions. The chlorination is conducted in the presence of a liquid solvent of chlorine. Examples show the use of sulfur and sulfur monochloride as such solvents. While this process shows a means for producing ferrous chloride, it does not disclose a practical method for separation of the iron materials from other materials.

In U.S. Pat. No. 3,652,219 a process is also disclosed wherein pyrite is reacted with sulfur chloride in an excess of sulfur chloride to form ferrous chloride. The patentee then chlorinates the iron to ferric chloride which he separates by distillation and then oxidzes the iron to iron oxide. This somewhat overcomes the disadvantage of the process of U.S. Pat. No. 2,895,796, but by an expensive and difficult route, i.e., the distillation and subsequent oxidation of ferric chloride. The process of U.S. Pat. No. 3,652,219 has a further disadvantage of causing the formation of noxious sulfur monochloride.

Processes other than chlorination have been attempted for processing iron from its ores in scrap, and the removal of iron contamination from other valuable materials, as this field is one of the major areas of industrial inorganic chemistry. As respects aqueous systems, it is known to dissolve iron in mineral acids and, after separation from unwanted impurities or from valuable products, to precipitate the iron as an oxide or hydrated oxide. In the aqueous system difficulties can be encountered in terms of difficult-to-filter precipitates and co-precipitation. In the case of sulfur-containing material it is difficult to convert all the sulfur to elemental sulfur in the presence of water. A part of the sulfur is inevitably becoming unwanted sulfate as the process proceeds.

When the metal to be recovered is present in nature as its sulfide, as in the case of iron, zinc and other metals, the recovery problem is compounded by the pollution problem and conformance with environmental clean air regulations. In the present commercial methods for treating sulfide ores and concentrates, the general practice involves smelting or roasting the sulfides through a complex series of operations which drive off the sulfur as sulfur dioxide. The metal values are effectively recovered by these operations. However, large volumes of sulfur dioxide are produced which are not always conveniently recovered so that serious air pollution results. As a substitute, hydrometallurgical processes, which convert the sulfide to elemental sulfur with recovery of the corresponding metal, are being extensively developed. Examples of such processes are those described in U.S. Pat. Nos. 3,673,061; 3,736,238 and 3,766,926, which describe effective process for electrolytic dissolution of sulfide concentrates. Chemical leaching processes as a substitute for the hydrometallurgical processes are described in U.S. Pat. No. 3,767,543 and U.S. Bureau of Mines Report on Investigations 7474.

A major difficulty with the present hydrometallurgical processes is that it is not practically possible to convert all the sulfide sulfur to elemental sulfur. A part of the sulfur is inevitably converted to sulfate which constitutes a waste of energy and a disposal problem. Further, the sulfur is finely divided and intermixed with gangue so that special processes are required for its economic recovery. Also, it is not possible with presently available hydrometallurgical processes to work at very high concentrations of valuable metal, so that large volumes of solutions must be heated, cooled, pumped, and processed.

Accordingly, it is the principal object of this invention to provide a process for the chlorination of metals from their compounds which is a substantially pollution-free process, which is free of the problem of formation of high melting chlorides which coat particles of the compound, which avoids the formation of a sticky liquid sulfur, and which obviates other problems of the prior art processes for recovery of metals from the ores.

PRIOR ART STATEMENT

Delarue, Guy, *Chimie Analytique*, Vol. 44, No. 3, p. 91 (March, 1962) teaches the addition of an oxidant to solubilize a metal sulfide in a lithium chloride-potassium chloride fused bath and to oxidize sulfur ions. It further teaches that an excess of oxidant, e.g. $Fe^{+3}$, $Cu^{+2}$, $Cl_2$ and $Au^+$, causes the formation of sulfur monochloride, a noxious gas and pollutant.

U.S. Pat. No. 1,388,086 to Ashcroft discloses the use of a fused salt bath and chlorine to obtain the metal chlorides of sulfide ores. However, the presence of excess chlorine causes the formation of sulfur monochloride.

DISCLOSURE OF INVENTION

An uncombined metal or a metal of a compound, such as a sulfide, oxide, carbonate or sulfate, is converted in a liquid fused salt bath containing at least two metal salt chlorides to the corresponding metal chloride and elemental sulfur at low temperature and ambient pressure. One of the metal salts of the fused bath must be selected from the group consisting of ferrous chloride, ferric chloride, cuprous chloride, cupric chloride and mixtures thereof in an amount of at least 15% by weight of the bath. The other metal chloride of the fused salt bath is selected from the group consisting of alkali metal chlorides, alkaline earth metal chlorides, ammonium chloride, zinc chloride, iron chlorides, copper chlorides and mixtures thereof. Chlorine gas and/or sulfur monochloride may be added to the fused bath as supplements to the chlorination reaction of the metal sulfide.

It is a requirement that the formed metal chloride be soluble in the liquid fused salt bath mixture and the reaction be conducted in the absence of air. Because the formed metal chlorides are soluble in the liquid fused salt bath, they can be recovered by various conventional means. The metals for which the process is operative are those of groups 1b, 2a, 2b, 3b, 4a, 5a and 8 of the periodic table and the rare earth metals.

BEST MODE FOR CARRYING OUT THE INVENTION

The invention is based on the discovery that metal oxides, sulfides, carbonates and sulfates react with chlorine in relatively low temperature liquid fused baths to give the corresponding metal chlorides in liquid systems having melting points far below those of the metal chlorides. The same is true for uncombined metals. Because the formed chlorides are soluble in these low temperature liquid fused salt baths, the chlorides of the metals can be readily recovered from the liquid fused salt bath. The liquid fused salt bath must be selected so that the metal chloride produced is substantially soluble in the bath. In the case of metal sulfides, for example, the solution of the metal chloride as it is formed permits the rapid and complete reaction of the sulfide to elemental sulfur and metal chloride dissolved in the liquid fused salt mass. For example, ferric chloride and sodium chloride form a liquid fused salt bath at about 46 mole percent sodium chloride which melts at 156° C. If this liquid fused salt bath or melt is held at a temperature at or above its melting temperature and the appropriate sulfides are injected into it, with an inert carrier gas, for example, it has been found that a reaction will occur in which elemental sulfur and the metal chloride are formed, some of the ferric chloride being reduced to ferrous chloride.

It is a feature of the invention that is can be operated at relatively low temperatures, that is, temperatures below the melting point of the formed chlorides when they are not in the liquid fused salt bath. For example, ferrous chloride melts at 670° C. but at 420° C. it is soluble to about 35 mole percent in a liquid fused salt bath of ferric chloride and sodium chloride. It is therefore possible to rapidly and completely react about 12 mole percent of pyrite with chlorine in a sodium chloride-ferric chloride liquid fused salt bath at a temperature of about 420° C. Cerium chloride has a melting point of 800° C., yet it can be chlorinated with the present invention at 300° C. and chlorinates rapidly at 400° C.

The temperature required for rapid reaction depends upon the mineral or metal being processed, the components of the liquid fused salt bath and the solubility temperature of the formed chloride in the fused bath reaction medium. Ferric chloride and sodium chloride form a liquid fused salt bath at a temperature as low as 156° C. This liquid bath provides a lower practical operating limit for most chlorinations. Although ferric chloride sublimes at 350° C. this is effectively prevented by the presence of sodium chloride in the liquid fused salt bath. Thus, for example, in a ferric chloride-sodium chloride liquid fused salt bath mixture, chalcopyrite reacts very rapidly at 250° C., pyrite at 300° C. and sphalerite reacts rapidly at 350° C. For the metals and metal compounds for which this invention is operative the reaction temperature will range between 150° to 1100° C. Generally, a reaction temperature from about 150° C. to 550° C. is preferred and a temperature range of between about 350° C. and 450° C. is more preferred. It is a decided advantage of the invention that is is operated at a temperature below the softening point of glass which is about 500° C. In view of this, the chlorination reactions can be performed in glass equipment or glass-lined equipment.

The source of chlorine for the chlorination reaction is supplied by elemental chlorine gas, sulfur monochloride or a chlorine donor, such as ferric chloride or cupric chloride, or mixtures of these. However, it is essential that the fused liquid salt bath always contain copper chloride or iron chloride or both to the extent of at least 15% by weight of the bath. The iron chlorides or copper chlorides are effective in preventing the formation of sulfur monochloride even though as a chlorine source they are present in excess or are in the presence of excess chlorine. The reaction is conducted in the absence of air to prevent the formation of sulfur dioxide.

When the fused bath contains either ferric or cupric chloride, then the further addition of chlorine or a chlorine source is not necessary. Thus, it is preferred that one component of the fused liquid salt bath be either ferric chloride or cupric chloride. When ferrous or cuprous salts constitute a component of the bath, then chlorine gas or sulfur monochloride is supplied to the bath to convert a portion of the ferrous or cuprous chloride to ferric or cupric chloride, respectively, and/or to react directly with the metal or metal sulfide to form the chloride salt of the metal. Chlorine and/or sulfur monochloride can be added as supplemental sources of chlorine to fused baths containing ferric or cupric chloride to cause the regeneration of these chlorine donors and to react with the metal sulfide.

The needed iron chloride or copper chloride can be supplied to the liquid fused bath through the reaction between a metal ore containing iron and/or copper and chlorine. Examples of such ores are chalcopyrite and pyrite.

As to the recovery of elemental sulfur, at temperatures less than 400° C., but above the melting point of sulfur, the sulfur will be found as a molten pool floating on the liquid fused salt bath, from which it is readily separated. At temperatures near 440° C., the boiling point of sulfur, the sulfur is readily volatilized and can be easily condensed to a liquid without escape to the atmosphere.

The metal compounds for which the process is operative are those of the metals of the groups 1b, 2a, 2b, 3b, 4a, 5a, 8 of the periodic table and the rare earth metals. The compounds of these metals for which the process is operative are the sulfides, oxides, carbonates and sulfates. The process is operative for chlorinating metals, such as iron, in the uncombined state.

The salts which are operative for the liquid fused salt bath mixture are the chlorides of the alkali metals, alkaline earth metals, zinc, iron, copper and ammonia. The composition of the bath used will depend upon the required melting temperature of the liquid fused salt mixture. As previously stated, it is preferred to have ferric chloride or cupric chloride in the mixture as it also may serve as the donor of chlorine. This is because iron and copper exist in two valent states and the ferric chloride or cupric chloride is reduced to ferrous chloride or cuprous chloride in the reaction. The other chlorides in the fused bath mixture do not enter into the reaction.

The amount of the metal compound which can be reacted with chlorine either introduced as such or from the chlorine donor, varies with the reactants and the composition of the liquid fused salt bath mixture. For example, the amount of sulfide which can be reacted with a given amount of ferric chloride is a function of the solubility of the metal chloride formed at the reaction temperature and the solubility of ferrous chloride.

The process is illustrated by reference to certain specific minerals. Pyrite reacts according to the following reaction:

$$FeS_2 + 2FeCl_3 \rightarrow 3FeCl_2 + 2S°$$

At 420° C. ferrous chloride is soluble to about 35 mole percent in a liquid fused salt bath of ferric chloride and sodium chloride. It is therefore possible to rapidly and completely react about 12 mole percent pyrite in a sodium chloride-ferric chloride liquid fused salt bath. The amount of pyrite to be reacted can be increased by injecting chlorine because of the reaction:

$$2FeCl_2 + Cl_2 \rightarrow 2FeCl_3$$

Another liquid fused salt bath which has been found effective is a zinc chloride-sodium chloride mixture having about 60 mole percent sodium chloride which melts at 262° C. A zinc chloride-sodium chloride liquid fused salt bath has an appreciable solubility for other metal chlorides such as iron chloride, being capable of dissolving about 30 mole percent ferrous chloride at 400° C. as an example. The process is illustrated as follows:

$$ZnS + Cl_2 \xrightarrow{NaCl/ZnCl_2} ZnCl_2 + S°$$

or $$ZnS + 2FeCl_3 \xrightarrow{NaCl/ZnCl_2} ZnCl_2 + 2FeCl_2 + 2S°$$

Similarly, chalcopyrite is processed as follows:

$$CuFeS_2 + 1.5Cl_2 \xrightarrow{NaCl/ZnCl_2} CuCl + FeCl_2 + 2S°$$

The important factor is that the ferrous chloride (melting point 670° C.) and cuprous chloride (melting point 422° C.) be soluble in the liquid fused salt melt at the temperature of the reaction.

The reaction of zinc sulfide with ferric chloride in a liquid fused salt bath of ferric chloride-zinc chloride-sodium chloride is as follows:

$$ZnS + 2FECl_Z \xrightarrow{ZnCl_2/NaCl} ZnCl_2 + 2FeCl_2 + S°$$

Another example of a liquid fused salt bath is sodium chloride-ferric chloride which forms a liquid fused salt bath at about 48 mole percent sodium chloride with a melting point as low as 156° C. Ferrous chloride forms with ferric chloride and sodium chloride a ternary system in which ferrous chloride has increasing solubility with increasing temperature. At 420° C. about 35 mole percent ferrous chloride is liquid. Similarly, zinc chloride forms a liquid fused salt bath with sodium chloride. At about 46 mole percent zinc chloride the melting temperature is 262° C. Ferrous chloride, zinc chloride and sodium chloride form a ternary system which again is a solvent for ferrous chloride at 400° C. A large number of other chloride salt combinations are possible and practical. The essential requirements are that the salt bath be liquid at the operating temperature chosen and that the metal chloride be soluble in reasonable amounts in the bath at the operating temperature chosen.

Chlorination of the metal oxides presents a slightly different problem than chlorination of the sulfides in that a reductant, such as carbon or sulfur, is additionally frequently added to the fused salt bath. If the metal oxide is added to a ferric chloride-sodium chloride liquid fused bath, for example, along with a suitable reductant, such as carbon or sulfur, the oxide will be reduced and the corresponding metal chloride formed. Reaction temperatures will depend upon the metal being chlorinated. Base metal oxides, such as zinc, lead and copper oxides, chlorinate readily below 400° C. Rare earth metal oxides also chlorinate rapidly at 400° C.

The chlorination of oxides is illustrated by the following reactions:

$$Fe_2O_3 + 1.5C + 4FeCl_3 \rightarrow 6FeCl_2 + 1.5CO_2$$

$$ZnO + 0.5C + 2FeCl_3 \rightarrow ZnCl_2 + 2FeCl_2 + 0.5CO_2$$

$$La_2O_3 + 1.5C + 3Cl_2 \rightarrow 2LaCl_3 + 1.5CO_2$$

$$La_2O_3 + 1.5S + 3Cl_2 \rightarrow 2LaCl_3 + 1.5SO_2$$

In addition to oxides, sulfates may be chlorinated in the same manner. An example is:

$$BaSO_4 + C + Cl_2 \rightarrow BaCl_2 + CO_2 + SO_2$$

In each case the important factor that permits a good chlorination at low temperature is that the resulting metal chloride is soluble in the liquid fused salt bath at the temperature of reaction.

The recovery of the formed chloride salt may be accomplished by conventional methods. The liquid fused salt bath mixture may be selectively cooled to crystallize the desired metal chloride followed by its separation by a liquid/solids separation such as filtration. Ferrous chloride, for example, can be crystallized from the melt by cooling and recovered by filtration. The iron can then be recovered from the ferrous chloride as ferric oxide by oxidation of the ferrous chloride to precipitate the iron oxide and regenerate the ferric chloride chlorinating agent in accordance with the following reaction:

$$6FeCl_2 + 1.5O_2 \rightarrow Fe_2O_3 + 4FeCl_3$$

The iron oxide is readily removed from the recycle ferric chloride by filtration or by volatilization of the ferric chloride.

Although the particle size of the metal ore, compound, et cetera introduced is not critical, a particle size of ½ inch or more can be used. Obviously, the more of the sample which is ground to a small particle size, the more surface area will be available for the chlorination reaction and, accordingly, the more effective the chlorination will be in terms of reaction rate and reaction completion. In the following examples the particle size varied from −14 mesh to −325 mesh.

The invention is illustrated by the examples which follow which are not limiting of the invention. In the following examples chlorine and/or the chlorine donor was present in excess of the amount required to convert the metal sulfides to their chlorides. Sulfur monochloride was not a product in any of the examples.

EXAMPLE 1

A liquid fused salt bath melting at 260° C. was made with 500 grams of ferric chloride, 30 grams of sodium chloride, 250 grams of zinc chloride and 120 grams of potassium chloride. One hundred grams of chalcopyrite were added to the liquid fused salt bath and 83 grams of chlorine bubbled into it after the bath became viscous. After about an hour, analysis of the bath showed that 99 percent of the copper had been reacted to form water soluble copper.

EXAMPLE 2

A galena concentrate containing substantial amounts of antimony (1.9 percent) and silver (100 ounces per ton) was reacted in a liquid fused salt bath comprised of 274 grams of ferric chloride and 126 grams of sodium chloride at 300° C. with 16 grams of chlorine which was bubbled through the bath. Acid soluble antimony and elemental sulfur were collected in a condenser. Ninety-nine percent of the lead was recovered as its chloride salt in an aqueous brine solution along with 95 percent of the silver. Four grams of elemental sulfur were recovered.

EXAMPLE 3

One hundred grams of a copper sulfide-arsenide concentrate containing 5.8 troy ounces per ton silver and 0.8 troy ounces per ton gold was reacted with 600 grams of a liquid fused salt bath comprised of 450 grams of ferric chloride and 150 grams of sodium chloride at a temperature of 400° C. No chlorine was introduced. Over 97 percent of the copper and 98 percent of the silver were recovered as their chlorides in a water leach of the reaction mass. The residue from the water leach solution contained 2.9 ounces of gold per ton (the gold not having reacted with ferric chloride). The residue was reacted a second time in a liquid fused salt bath comprised of 450 grams of ferric chloride and 150 grams of sodium chloride at 420° C. with 32 grams of chlorine which this time was bubbled through the bath. The gold all volatilized as an auric chloride. This example illustrates the capability to dissolve base metals and silver away from a gold-containing material by the use of ferric chloride, and the recovery of the gold by the use of chlorine.

EXAMPLE 4

One hundred and eighty-five grams of a commercial lead-zinc-copper-silver sulfide concentrate was reacted with 116 grams chlorine at 425° C. in a liquid fused salt bath comprised of 50 grams of ferric chloride, 100 grams of sodium chloride and 150 grams of zinc chloride. Thirty four grams of elemental sulfur were collected in a condenser. It was found that 92 percent of the zinc and 86 percent of the lead were soluble in aqueous brine, whereas none of the copper or silver was soluble. The copper-silver residue was reacted in a liquid fused salt bath of the same composition at 420° C. with an additional 48 grams of chlorine. In addition to bringing the overall lead and zinc solubility to above 98 percent, 97 percent of the copper and 98 percent of the silver were found to be soluble in aqueous brine. An additional 0.5 grams of sulfur was recovered.

EXAMPLE 5

A sample of mixed sphalerite and galena containing 38 percent zinc and 35 percent lead as sulfides was added to a fused bath containing 200 grams of cuprous chloride and 40 grams of sodium chloride at a temperature of 450° C. Forty percent of the cuprous chloride had previously been converted to cupric chloride by the addition of 32 grams of chlorine. The reaction mass was dissolved in brine. Ninety-six percent of the zinc and 99 percent of the lead were found as soluble chlorides. Part of the sulfur was found as elemental sulfur, and a part as the copper mineral covellite and chalcocite.

EXAMPLE 6

A chalcopyrite concentrate containing 25 percent copper and 27 percent iron was reacted in a molten bath of 200 grams of cuprous chloride and 40 grams of sodium chloride. Forty percent of the cuprous chloride had previously been converted to cupric chloride by the addition of 30 grams of chlorine. After reaction at 450° C. for 30 minutes, the reaction mass was cooled and dissolved in water. Ninety-eight percent of the iron was found to be water soluble ferrous chloride. Fifty percent of the sulfur was collected as elemental sulfur in a condenser. The balance of the sulfur was found associated with copper in the minerals covellite, chalcocite, and digenite.

This example illustrates the ability of cupric chloride to react with chalcopyrite and separate the iron in the chalcopyrite as ferrous chloride from residual copper sulfides. The copper minerals can then be reacted to form cuprous chloride and sulfur.

The copper sulfides can be reacted with additional CuCl$_2$ or FeCl$_3$ to produce CuCl and elemental sulfur. The cuprous chloride in turn can be processed to copper by means known to the art such as hydrogen reduction. By this means a high purity copper can be produced from chalcopyrite.

I claim:

1. A process for making the chloride of a metal selected from the group consisting of lead, zinc, copper, silver and gold from the sulfide of said metal in the absence of air which comprises:
   (a) forming a liquid fused salt bath in which the formed metal chloride is soluble and wherein the liquid fused salt bath comprises at least two different chlorides with one chloride comprising at least 15% by weight of the fused salt bath being selected from the group consisting of ferric chloride, ferrous chloride, cupric chloride, cuprous chloride and mixtures thereof and the other chloride being selected from the group consisting of alkali metal chlorides, alkaline earth metal chlorides, zinc chloride and ammonium chloride;
   (b) introducing the metal sulfide into the liquid fused bath in the presence of a chlorine source to form the metal chloride and elemental sulfur at a temperature below the melting point of the formed chloride; and
   (c) recovering the formed metal chloride from the fused bath mixture.

2. The process of claim 1 performed at a temperature of from about 150° C. to about 550° C.

3. The process of claim 1 wherein the chlorine source is selected from the group consisting of ferric chloride, cupric chloride, chlorine gas, sulfur monochloride and mixtures thereof.

4. The process of claim 3 wherein the chlorine source is cupric chloride.

5. The process of claim 3 wherein the chlorine source is ferric chloride.

6. The process of claim 3 wherein the chlorine source is elemental chlorine gas.

7. The process of claim 3 wherein the chlorine source is ferric chloride and chlorine gas.

8. The process of claim 3 wherein the chlorine source is cupric chloride and chlorine gas.

9. The process of claim 3 in which the metal sulfide is lead sulfide.

10. The process of claim 9 in which the fused salt bath is comprised of sodium chloride, ferric chloride and zinc chloride.

11. The process of claim 9 in which the fused salt bath is comprised of sodium chloride, cuprous choride and cupric chloride.

12. The process of claim 3 in which the metal sulfide is a zinc sulfide.

13. The process of claim 12 in which said fused salt bath is comprised of ferric chloride, sodium chloride and zinc chloride.

14. The process of claim 12 in which said fused salt bath is comprised of sodium chloride, cuprous chloride and cupric chloride.

15. The process of claim 3 in which the metal sulfate is a copper sulfide.

16. The process of claim 15 in which said fused salt bath is comprised of ferric chloride, sodium chloride, zinc chloride and potassium chloride.

17. The process of claim 15 in which said fused salt bath is comprised of ferric chloride and sodium chloride.

18. The process of claim 15 in which said fused salt bath is comprised of sodium chloride, cuprous choride and cupric chloride.

19. The process of claim 3 in which the sulfide is a silver sulfide.

20. The process of claim 19 in which said fused salt bath is comprised of ferric chloride and sodium chloride.

21. The process of claim 19 in which said fused salt bath is comprised of ferric chloride, sodium chloride and zinc chloride.

22. The process of claim 3 in which the metal sulfide is a gold sulfide.

23. The process of claim 22 in which said fused salt bath is comprised of ferric chloride and sodium chloride.

* * * * *

UNITED STATES PATENT AND TRADEMARK OFFICE
CERTIFICATE OF CORRECTION

PATENT NO. : 4,209,501

DATED : June 24, 1980

INVENTOR(S) : Paul R. Kruesi

It is certified that error appears in the above—identified patent and that said Letters Patent is hereby corrected as shown below:

Title, delete "ZINZ" insert --ZINC--.

Claim 15, column 10, line 19, delete "sulfate" insert --sulfide--.

Claim 19, column 10, line 30, after "the" insert --metal--.

Signed and Sealed this

Twenty-third Day of September 1980

[SEAL]

Attest:

SIDNEY A. DIAMOND

Attesting Officer

Commissioner of Patents and Trademarks